United States Patent [19]

Fuyama

[11] Patent Number: 5,355,125
[45] Date of Patent: Oct. 11, 1994

[54] ELECTRONIC REGISTER WITH MACRO KEY AND SECURITY

[75] Inventor: Seiji Fuyama, Yokohama, Japan

[73] Assignee: Matsushita Electric Industrial Co., Ltd., Osaka, Japan

[21] Appl. No.: 857,667

[22] Filed: Mar. 26, 1992

[30] Foreign Application Priority Data

Apr. 5, 1991 [JP] Japan .................... 3-072903

[51] Int. Cl.$^5$ .............................................. G07G 1/12
[52] U.S. Cl. .................... 340/825.31; 341/22; 364/709.15
[58] Field of Search .......... 340/825.31, 825.3; 341/22, 23; 364/200 MS File, 709.01, 709.08, 709.12, 709.14, 709.15, 709.16, 710.04, 404, 405

[56] References Cited

U.S. PATENT DOCUMENTS 4,193,113  3/1980  Cykowski ............ 364/200 MS File
4,766,540  8/1988  Mizuno .

FOREIGN PATENT DOCUMENTS 253198   2/1990  Japan .
2263293  10/1990  Japan .
2108744  5/1983  United Kingdom .

*Primary Examiner*—Donald J. Yusko
*Assistant Examiner*—John Giust
*Attorney, Agent, or Firm*—Stevens, Davis, Miller & Mosher

[57] ABSTRACT

The present invention has an object of providing an electronic register with macro key function which can achieve various functions corresponding to seven kinds of codes including a mode check function in addition to a limited function of collectively performing a plurality of key processings existing on the keyboard. Seven kinds of codes, including the mode check code for checking the operation of the register, in addition to the key code on the keyboard, are set as macro key set data to the memory corresponding to the macro key on the keyboard. When any one of the seven kinds of code exists in the macro key set data which has been set corresponding to the macro key, processing of the operation mode corresponding to this code is carried out.

8 Claims, 10 Drawing Sheets

3b ID KEY

FIG. 5

| WORK AREA | 41 |
| TERMINAL ID DATA FILE | 42 |
| MODE SWITCH DATA FILE | 43 |
| OPERATOR ID DATA FILE | 44 |
| MACRO KEY SET FILE | 45 |
| MESSAGE SET FILE | 46 |
| ITEM SET FILE | 47 |
| REPORT DATA COLLECTION FILE | 48 |

ELECTRONIC REGISTER WITH MACRO KEY AND SECURITY

BACKGROUND OF THE INVENTION

The present invention relates to an electronic register to be utilized in the field of business processing or the like.

According to a conventional electronic register, an electronic register having a macro key has only limited functions that can be set by the macro key. The function that can be set by the macro key are limited to key codes existing on the keyboard of the electronic register. Accordingly, the functions are also limited such that the processings of a plurality of keys on the keyboard are collectively carried out. In this case, the macro key refers to a key which is registered in advance as a "macro key" to carry out processing of a plurality of keys in a predetermined sequence. Once this "macro key" is depressed, processing of the plurality of keys is carried out in a registered sequence.

However, according to the above-described conventional electronic register, there has been a problem that it is not possible to perform the following function because those functions which can be set to the macro key are limited to key code information on the keyboard of the electronic register.

(1) A function that, when the macro key has been depressed, the operation mode of the electronic register is checked and the macro key is made valid only in a specific operation mode.

(2) A function that, when the macro key has been depressed, the operation mode of the electronic register is altered to a specific operation mode so that the key operation function which is valid only in this specific operation mode is performed by the macro function in other operation mode.

(3) A function that, when the macro key has been depressed, the terminal identification (hereinafter to be referred to as ID) of the electronic register is checked and the macro key is made valid (enabled) only if the electronic register has a specific terminal ID.

(4) A function that, when the macro key has been depressed, the operator ID of the electronic register is checked and the macro key is made valid only if a specific operator ID has been set in the electronic register.

(5) A function that, when the macro key has been depressed, a specific message is displayed according to the macro key.

(6) A function that, when the macro key has been depressed, a macro key code of a macro key other than this macro key is set to macro key data which has been set corresponding to the first macro key so that a plurality of macro key set data are linked to one macro key.

(7) A function that, when the macro key has been depressed, a key input from the keyboard is processed in the macro key and macro key set data which has been set afterward is processed.

SUMMARY OF THE INVENTION

It is an object of the present invention to provide an excellent electronic register which solves the above-described problem of the prior-art technique and which can add a function of setting to the macro key a mode check code, a mode set code, a terminal ID check code, an operator ID check code, a message display code, a macro key code and a pause code, in addition to key code information on the keyboard.

In order to achieve the above object, the present invention provides a unit for setting to the memory of the register, set codes such as a mode check code, a mode set code, a terminal ID check code, an operator ID check code, a message display code, a macro code and a pause code, in addition to key code information on the keyboard, together with number of macro key set data, corresponding to the macro key on the keyboard. In the processing of reading key codes from the keyboard, if any one of the above set codes exists in the macro key set data which has been set corresponding to the macro key, and when the operation mode of the register matches the mode corresponding to this set code, the macro key information set to the macro key and the set number of the macro key information are led from the set memory to the work area so that the macro key information is sequentially transferred when the macro key information is a key code of the register.

Accordingly, the present invention has an advantage that it is possible to have a function of making a macro key valid, a function to be performed by the macro key, a function of automatically displaying a specific message, a function of linking a plurality of macro key set data to one macro key and a function of processing a group of set key codes, by additionally having a mode check code, a mode set code, a terminal ID check code, an operator ID check code, a message display code, a macro key code and a pause code, in addition to key code information on the keyboard.

DESCRIPTION OF THE PREFERRED EMBODIMENT

Figure 1:
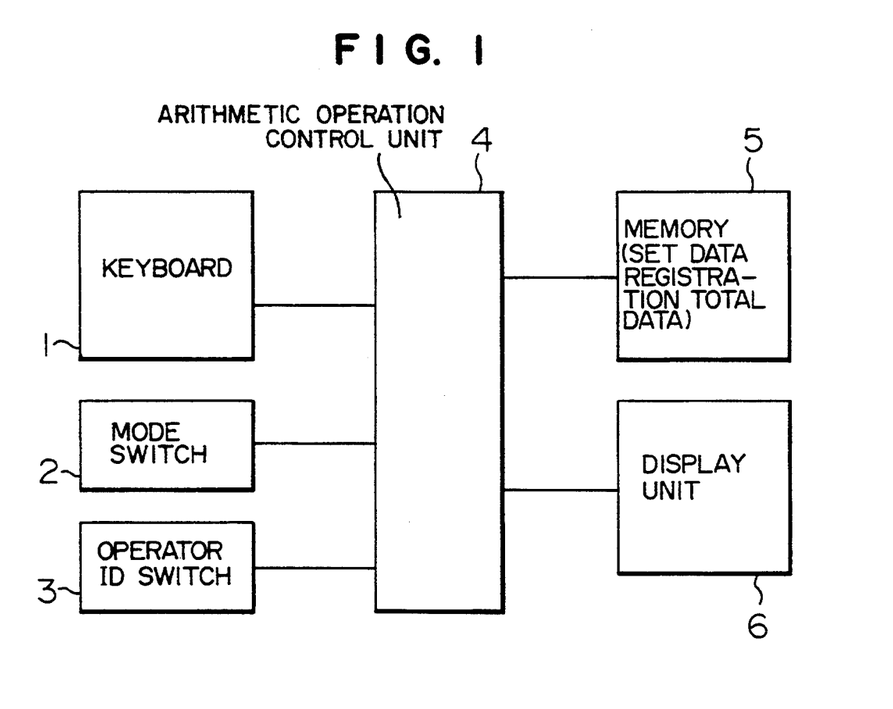
FIG. 1 is a block diagram showing a configuration of an electronic register according to one embodiment of the present invention.

FIG. 1 shows a configuration of a first embodiment of the present invention. In FIG. 1, 1 designates a keyboard, on which necessary keys such as a register key, an item registration key, a total key, a sub-total key and a macro key are disposed. When each key has been depressed, a key code corresponding to each key occurs and this key code is applied to an arithmetic control unit 4.

2 designates a mode switch which assigns an operation mode of the electronic register such as registration (REG), manager registration (MGR), inspection (X), adjustment (ZX) and setting (P). Data of this mode switch 2 is sent to the arithmetic control unit 4 and the data is read by the arithmetic control unit 4 prior to the starting of a processing program of each operation of the electronic register. The data is then stored in a mode switch data file within a memory 5.

3 designates an operator ID switch for assigning an operator ID of the operator which operates the electronic register. Data of the operator ID switch 3 is sent to the arithmetic control unit 4 and the data is read by the arithmetic control unit 4 prior to the starting of a processing program of each operation of the electronic register. The data is then stored in an operator ID data file 44 (FIG. 5) within the memory 5.

Figure 3:
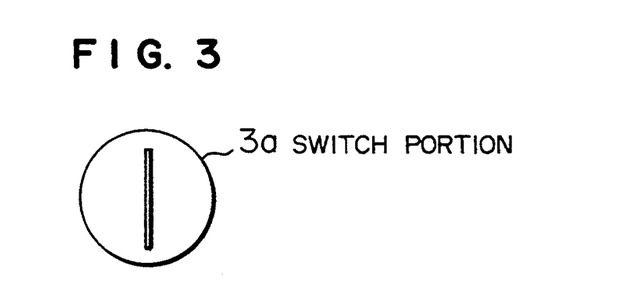
FIG. 3 is a front view of a switch portion of an operator ID switch in the electronic register.
Figure 4:
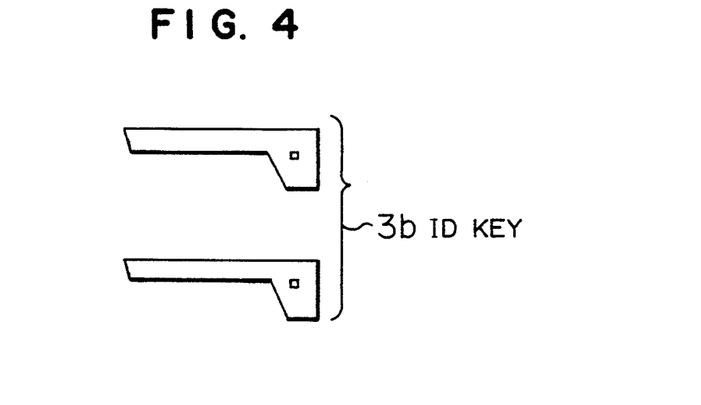
FIG. 4 is a front view of an ID key of the operator ID switch.

The operator ID switch 3 has a configuration to input an ID key 3b of the operator shown in FIG. 4 to a switch portion 3a shown in a front view of FIG. 3.

Figure 5:
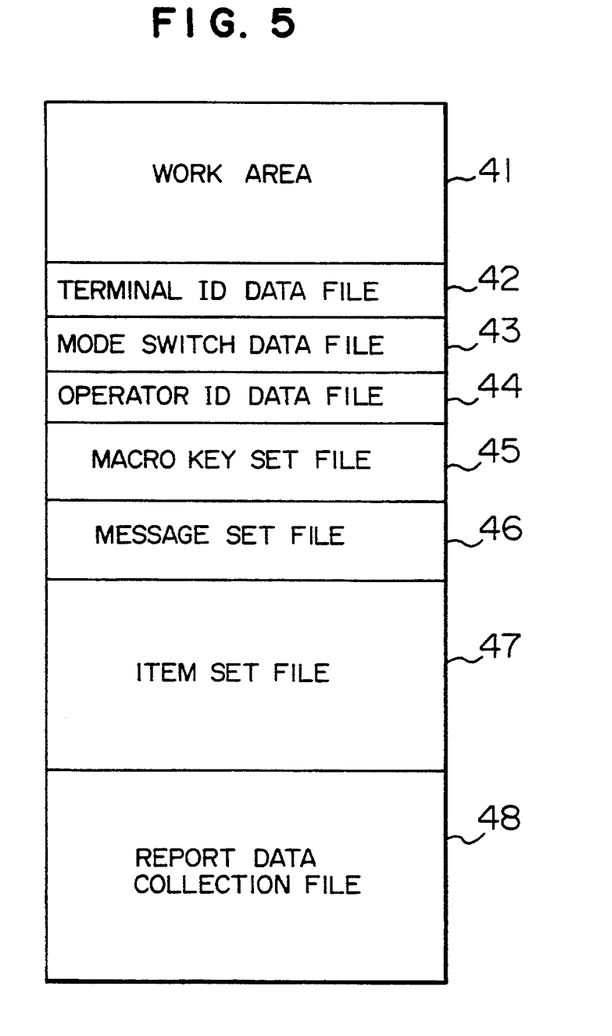
FIG. 5 is an internal configuration diagram of a memory in the electronic register.

An internal structure of the memory 5 is shown in FIG. 5. In FIG. 5, 41 designates a work area to be used for an internal operation, 42 designates a terminal ID data file in which a terminal ID of this electronic register has been set in advance, 43 designates a mode switch data file for storing data of the mode switch 2, 44 designates an operator ID file for storing data of the operator switch 3 as described above, 45 designates a macro key set file for storing macro key information, corresponding to a macro key number, for prescribing the operation of a macro key when a key code inputted from the keyboard 1 is the macro key, 46 designates a message set file which has been set corresponding to a message display code that can be set as macro key information to the macro key, 47 designates an item set file for storing a product name and a unit price corresponding to each item code in order to read the product name and the unit price of each item code inputted from the keyboard 1 when each item is registered, and 48 designates a data collection file for storing report data.

Figure 6:
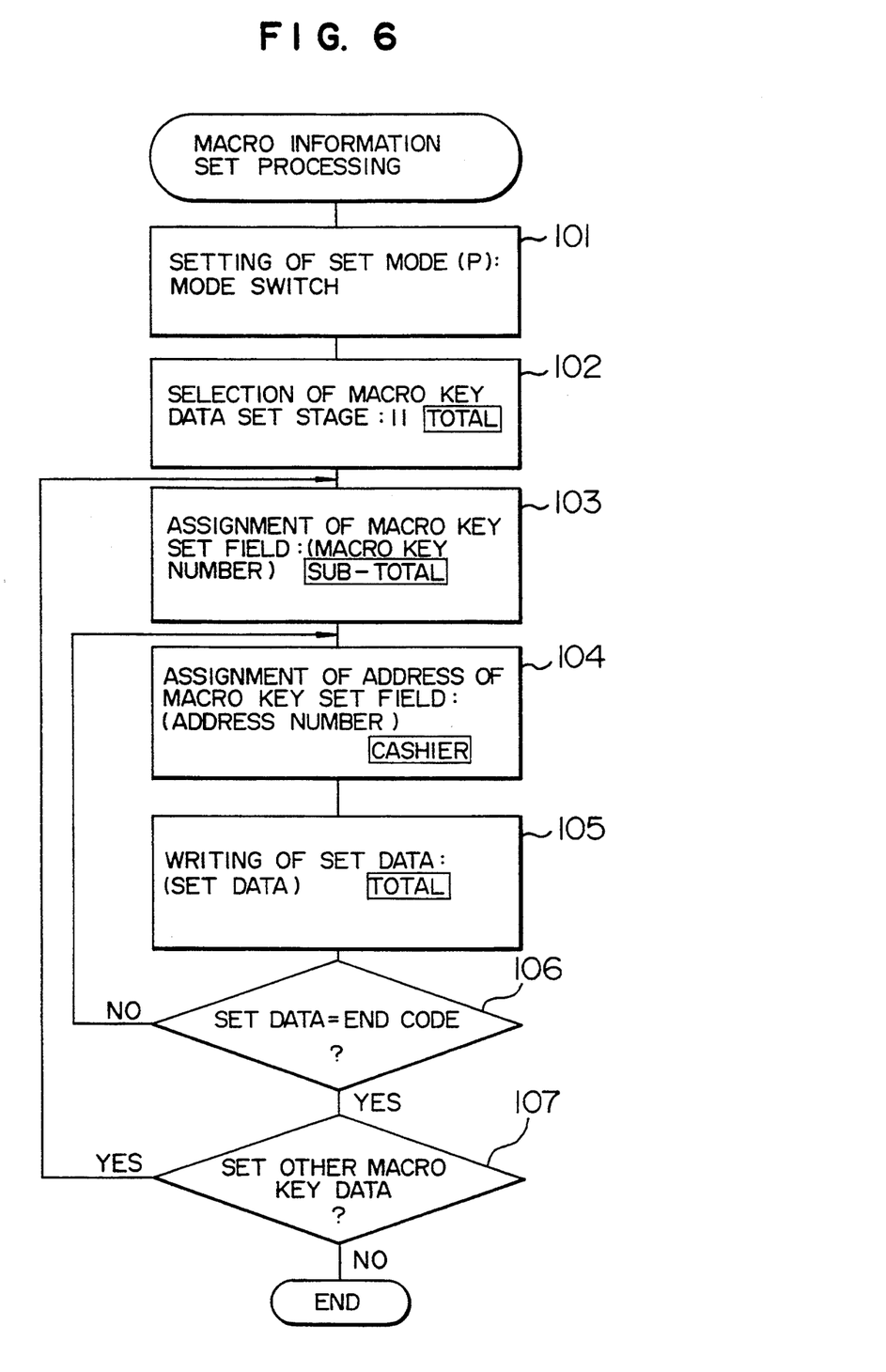
FIG. 6 is a flow chart for explaining a set-processing of macro information of the electronic register.
Figure 7:
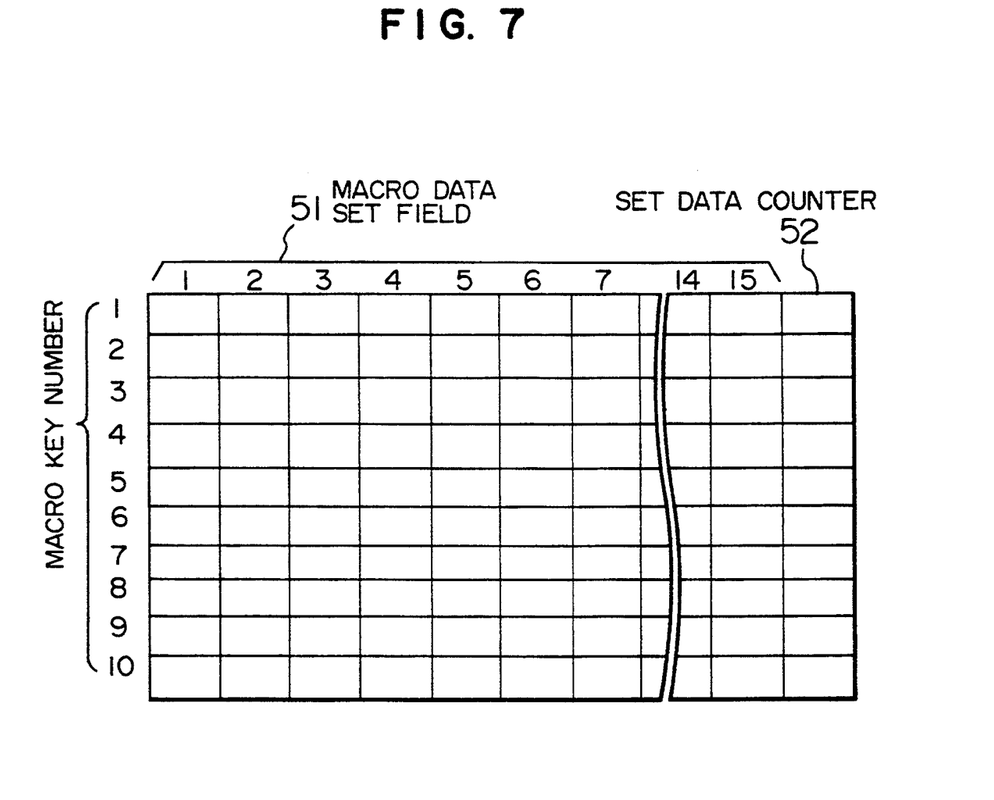
FIG. 7 is a structure diagram of a macro key set file to be applied to the electronic register.

Next, operation of the first embodiment will be explained. FIG. 6 is a flow chart for showing the flow of the operation for setting macro key information to the memory 5 of the electronic register. A macro key set file 45 within the memory 5 is structured by 15 macro data set fields 51 corresponding to each macro key number and set data counters 52 for storing data numbers set to the macro data set fields 51, as shown in FIG. 7.

Figure 2:
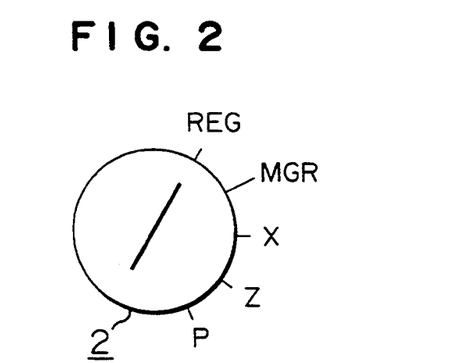
FIG. 2 is a front view of a mode switch in the electronic register of FIG. 1.

In Step 101, the operation of the electronic register is assigned to a set mode P shown in FIG. 2 by the mode switch 2, and in Step 102, "11" ("total") is set on the keyboard 1 to select a macro key data set stage 11.

Then, "1" ("sub-total") is set on the keyboard 1 to set the macro key set field 51 corresponding to the macro key number "1" within the macro key set file 45 (Step 103).

Then, "1" ("CASHIER") is set on the keyboard 1 to assign the address "1" of the macro key set field 51 (Step 104). Then, the macro key data ("total") is set to set the macro key data macro key number "1" to the address "1" of the set field 51 (Step 105).

In Step 106, when endcode has been set as macro key data, the address number of the macro set field 51 at that time is stored as set data number in the set data counter 52 (Step 107). Thus, setting of the macro key of this address number ends.

Figure 8:
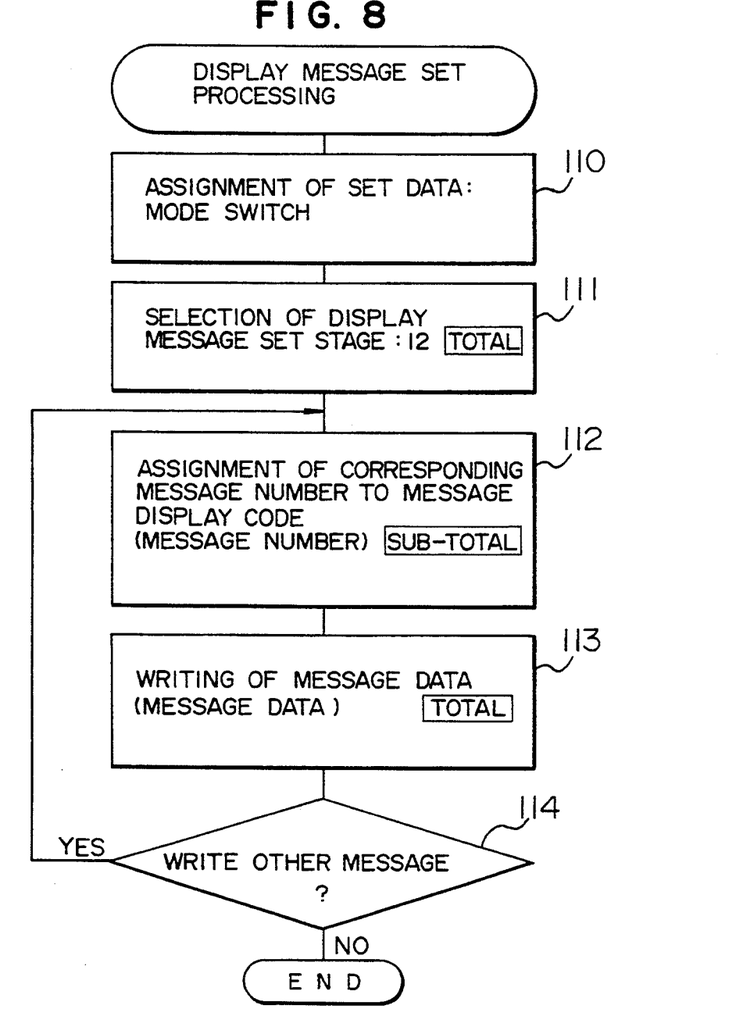
FIG. 8 is a flow chart for explaining a set processing of display message data of the electronic register.
Figure 9:
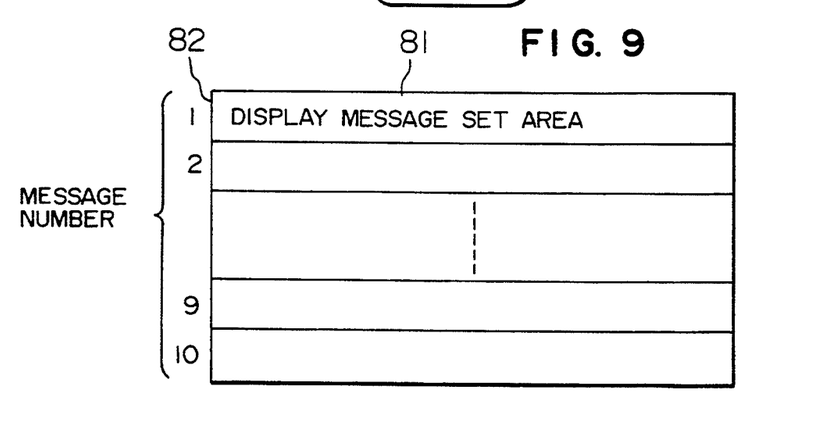
FIG. 9 is an explanatory diagram of a structure of a display message set file in the electronic register.

FIG. 8 is a flow chart for showing the flow of the operation for setting a display message to the message set file 46. As shown in FIG. 9, the message set file 46 consists of ten display message set areas 81.

This shows that there are ten kinds of message display code numbers 82 from "1" to "10" as macro key set data, and that the display message set area 81 is set from the number "1" to "10" corresponding to the respective message display code numbers.

In Step 110 in FIG. 8, the set mode P is set by the mode switch 42, and in Step 111, "12" ("total") is set on the keyboard 1 to select the display message set stage "12".

In Step 112, "1" ("sub-total") is set on the keyboard 1 to assign the display message set area number "1" corresponding to the message display code number "1". Then, in Step 113, the display message data ("total") is set on the keyboard 1 to set the message data in the display message set area 81 of the display message number "1".

The key operations on the keyboard 1 are repeated as shown in the flow chart of FIG. 8, so that desired display message data is set to the message set file 46.

When another message is to be written in Step 114, the process goes back to the processing in the Step 112, and the processing ends when another message is not written.

Figure 10:
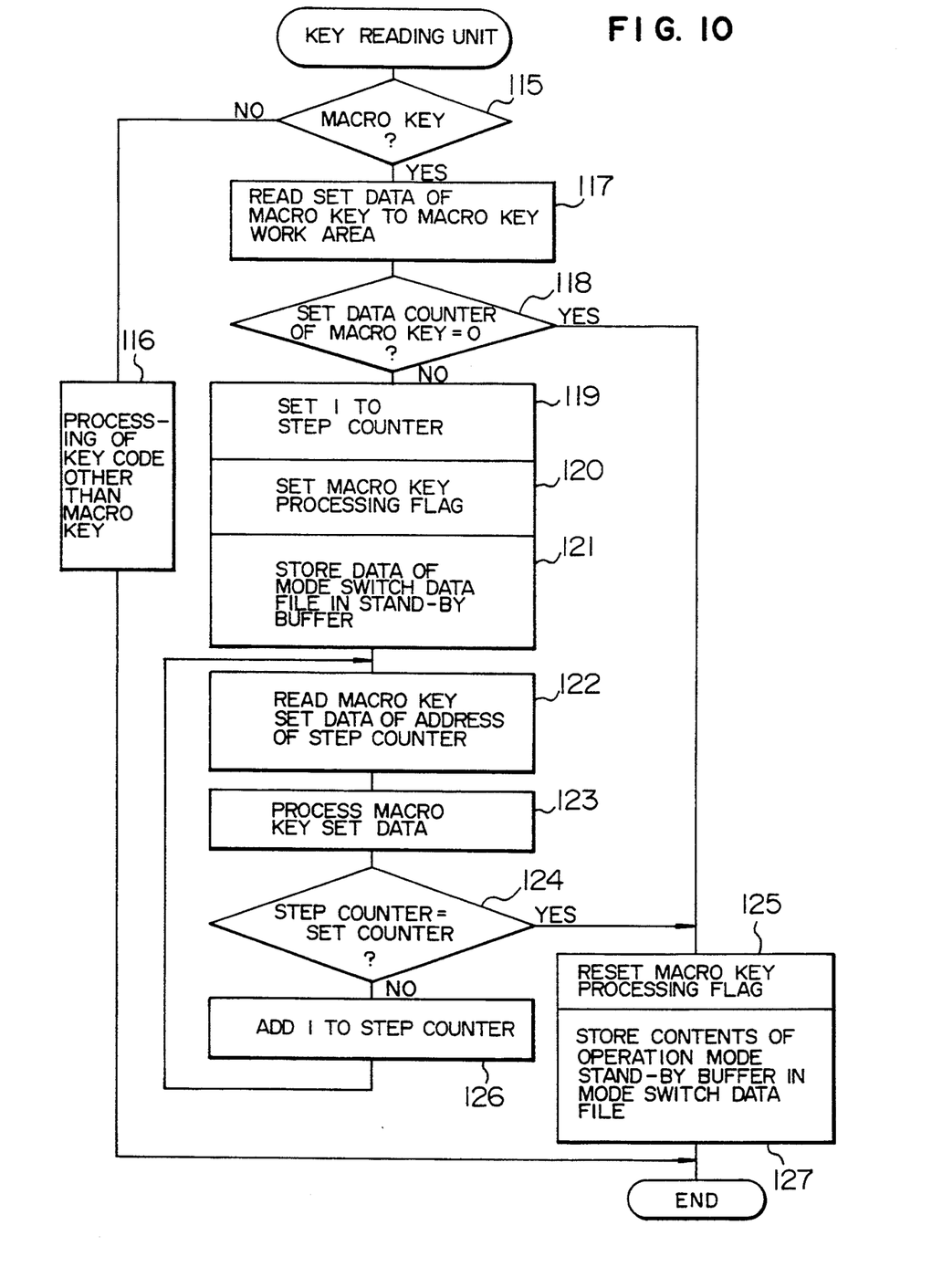
FIG. 10 is a flow chart for explaining a key read processing of the electronic register.

FIG. 10 is a flow chart for showing the read processing operation for reading from the key-board 1. When each key on the keyboard 1 has been operated, a key code corresponding to each of these keys occurs and each key code is applied to the arithmetic control unit 4.

In Step 115, the arithmetic control unit 4 decides whether an inputted key code is a macro key or not. As a result of the decision, when the inputted key code is not a macro key, the process jumps to Step 116 by branching from the NO side of the Step 115. In the Step 116, each processing program is executed corresponding to each key code as a key code other than a macro key, in the same manner as the prior-art technique. The processing of "branching to each processing program corresponding to a key code" is a key code decoding processing.

When a key code has been decided to be a macro key in the Step 115, the process goes to Step 117 from the YES side of the Step 115, to execute the processing program of the macro key in the Step 117 afterwards as described below.

First, in the Step 117, the set data corresponding to the macro key is read from the macro key set file 45 to the work area 41 to be used for an internal arithmetic operation.

Figure 11:
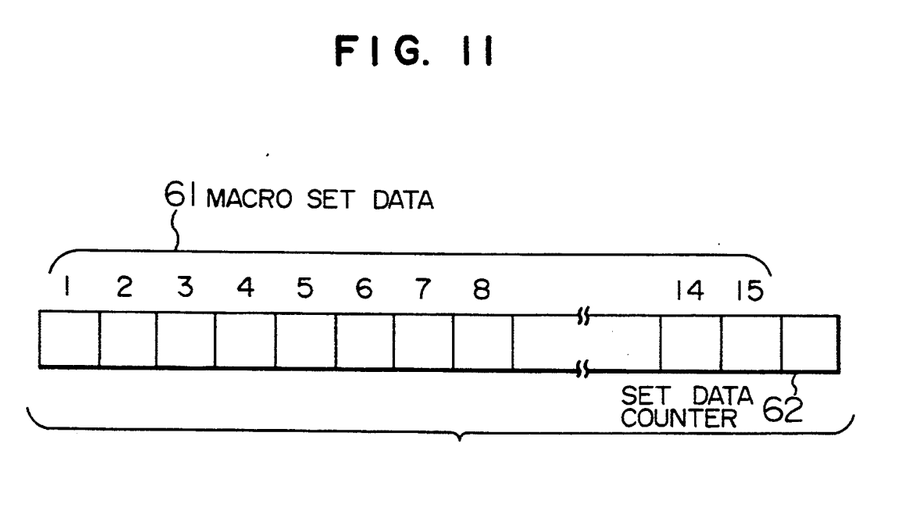
FIG. 11 is a structure diagram of a macro key work area and a set data counter within a macro key work area in the electronic register.

Then, the process goes to Step 118. In the Step 118, a set data counter 62 shown in FIG. 11 for the set data that has been read on the work area 41 is checked. If the result of this check is 0, the read processing of this macro key ends because macro set data has not been set to this macro key.

Figure 12:
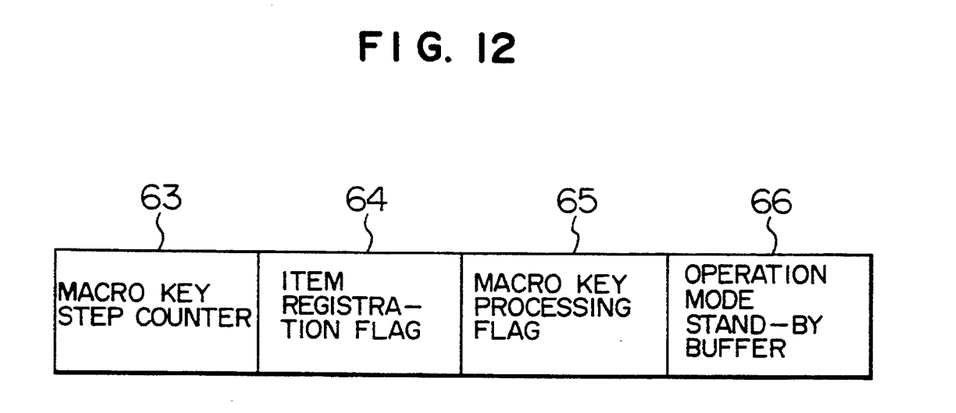
FIG. 12 is a structure diagram of a macro key step counter, an item registration flag, a macro key processing flag and an operation mode stand-by buffer within the macro key work area in the electronic register.

When the data counter 62 is not 0 in the Step 118, the process goes to Step 119 from the No side of the Step 118. In the Step 119, "1" is set to a macro key step counter 63 shown in FIG. 12 then, in Step 120, a macro key processing flag 65 is set.

Further in Step 121, the contents of the mode switch data file 43 are set to an operation mode standby buffer 66, to prepare for the case where the macro key data is a mode set code.

Figure 13:
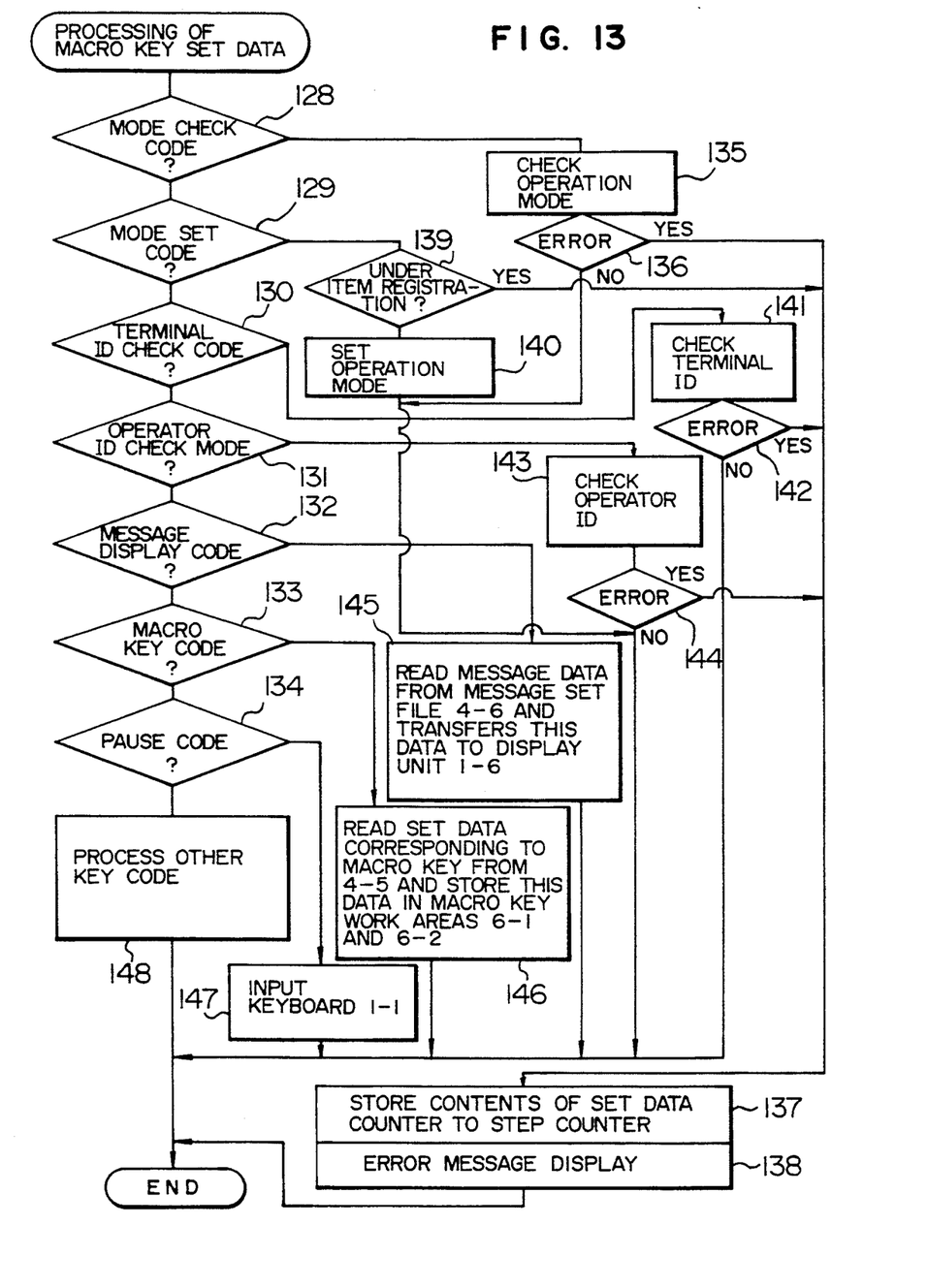
FIG. 13 is a flow chart for showing the flow of macro key set data processing operation in the flow chart of FIG. 10.

Next, in Step 122, the macro key set data 61 (FIG. 11) of the address corresponding to the macro key Step counter 63 is read, and the corresponding processings are carried out in Step 123. Subroutines of the Step 123 are shown in FIG. 13.

The macro key set data is processed in the Step 123, and then in Step 124, the value of the macro key step counter 63 is compared with the value of the set data counter 62. As a result of the comparison, when these values coincide, this means that the processing of the final set data has been finished. Then, the process goes to Step 125 to end this read processing of the macro key.

When the value of the macro key step counter 63 does not coincide with the value of the set data counter 62 in the Step 124, the process goes to Step 126. In the Step 126, "1" is added to the macro key Step counter 63, and then the process returns to the Step 122 again.

On the other hand, in the Step 125, the macro key processing flag 65 showing the state that the macro key is being processed is reset, and the process goes to Step 127. In the Step 127, the contents of the operation mode stand-by buffer 66 are stored in the mode switch data file 43, which is necessary as a post-processing when the mode set code has been executed as macro key data. Then, the read processing of the macro key ends.

Even if the mode set code has not been executed, the contents of the operation mode stand-by buffer 66 are stored in the mode switch data file 43. In this case, no change occurs because the contents of the operation mode stand-by buffer 66 are, by nature, the same as the contents of the mode switch data file 43.

The macro key set data processing in the Step 123 will be explained based on the flow chart shown in FIG. 13. As explained for the processing in the Step 123, the macro key set data of the address corresponding to the macro key step counter 63 is read. Then, as shown in the flow chart of FIG. 13, each of the macro key set data is checked in Steps 128 to 134, to decide whether or not each macro key is a mode check code, or a mode set code, or a terminal ID check code, or an operator ID check code, or a message display code, or a macro key code or a pause code.

When the result of the decision in the Step 128 has shown that the macro key set data is a mode check code, in Step 135, a check is made to decide whether the operation mode corresponding to this mode check code coincides with the mode switch data file 43. Then, the "processing of the macro key set data" ends.

When the operation mode corresponding to the mode check code does not coincide with the mode switch data file 43, the process moves from the Step 135 to Step 136 in which ERROR decision processing is carried out. Then, the process moves to Step 137. In the Step 137, the value of the set data counter 62 is stored in the macro key step counter 63. In Step 138, an error message is transferred to the display unit 6. Then, the "processing of the macro key set data" ends.

In this case, the purpose of storing the value of the set data counter 62 in the macro key step counter 63 is to end the read processing of the macro key at the point of time when an error occurs, by setting the data of the set data counter 62 to be the same as the data of the macro key step counter 63.

When the macro key set data is a mode set code, the process branches from the Step 129 to the Step 139. In the Step 139, whether the electronic register is in the middle of item registration (in the middle of transactions) or not is checked by the item registration flag 64. As a result of the check, if the electronic register is not in the middle of item registration, the process goes to Step 140. In the Step 140, the operation mode corresponding to this mode set code is stored in the mode switch data file 43. Thus, the "processing of the macro key set data" ends.

When the electronic register is in the middle of item registration as a result of the check in the Step 139, the process branches from the YES side of the Step 139 to the Step 137. In the Step 137, the value of the set data counter 62 is stored in the macro key step counter 63. In the Step 138, an error message is transferred to the display unit 6. Thus, the "processing of the macro key set data" ends.

When the macro key set data is a terminal ID check code, a check is carried out Step 141 to see whether the terminal ID corresponding to the terminal ID check code coincides with the terminal ID data file 42. When the terminal ID coincides with the terminal ID check code as a result of the check, the "processing of the macro key set data" ends.

When the terminal ID does not coincide with the terminal ID check code as a result of the check, the process moves from the Step 141 to Step 142 in which ERROR processing is carried out. Then, in the Step 137, the value of the set data counter is stored in the macro key step counter 63. In the Step 138, an error message is transferred to the display unit 6. Thus, the "processing of the macro key set data" ends.

When the macro set data is an operator ID check code, whether the operator ID corresponding to this operator ID check code coincides with the operator ID data file 44 or not is checked in Step 143. When the operator ID coincides with the operator ID data file 44 as a result of the check, the "macro key set data processing" ends.

When the operator ID does not coincide with the operator ID data file 44 as a result of the check in the Step 143, the ERROR processing is carried out in Step 144, and the value of the set data counter 62 is stored in the macro key step counter 63 in the Step 137. An error message is transferred to the display unit 6 in the Step 138. Then the "macro key set data processing" ends.

When the macro key set data is a message display code, message data corresponding to this message display code is read from the message data file 46 and this is transferred to the display unit 6 in Step 145. Then, the "macro key set data processing" ends.

When the macro key set data is a macro key code, the process moves from the Step 133 to Step 146. In the Step 146, set data corresponding to the macro key code is read from the macro key set file 45 and this is stored in the macro key work area 61 and the set data counter 62. Then, the "macro key set data processing" ends.

When the macro key set data is a pause code, the process moves from the Step 134 to Step 147. In the Step 147, the key input from the keyboard 1 is processed. Then, the "macro key set data processing" ends.

When the macro key set data is not any one of the above-described seven kinds of code of the mode check code, the mode set code, the terminal ID check code, the operator ID check code, the message display code, the macro key code and the pause code, each processing program corresponding to each key code is executed in the manner similar to the "key code processing other than the macro key" shown in the Step 116 of the flow chart shown in FIG. 10.

Figure 14:
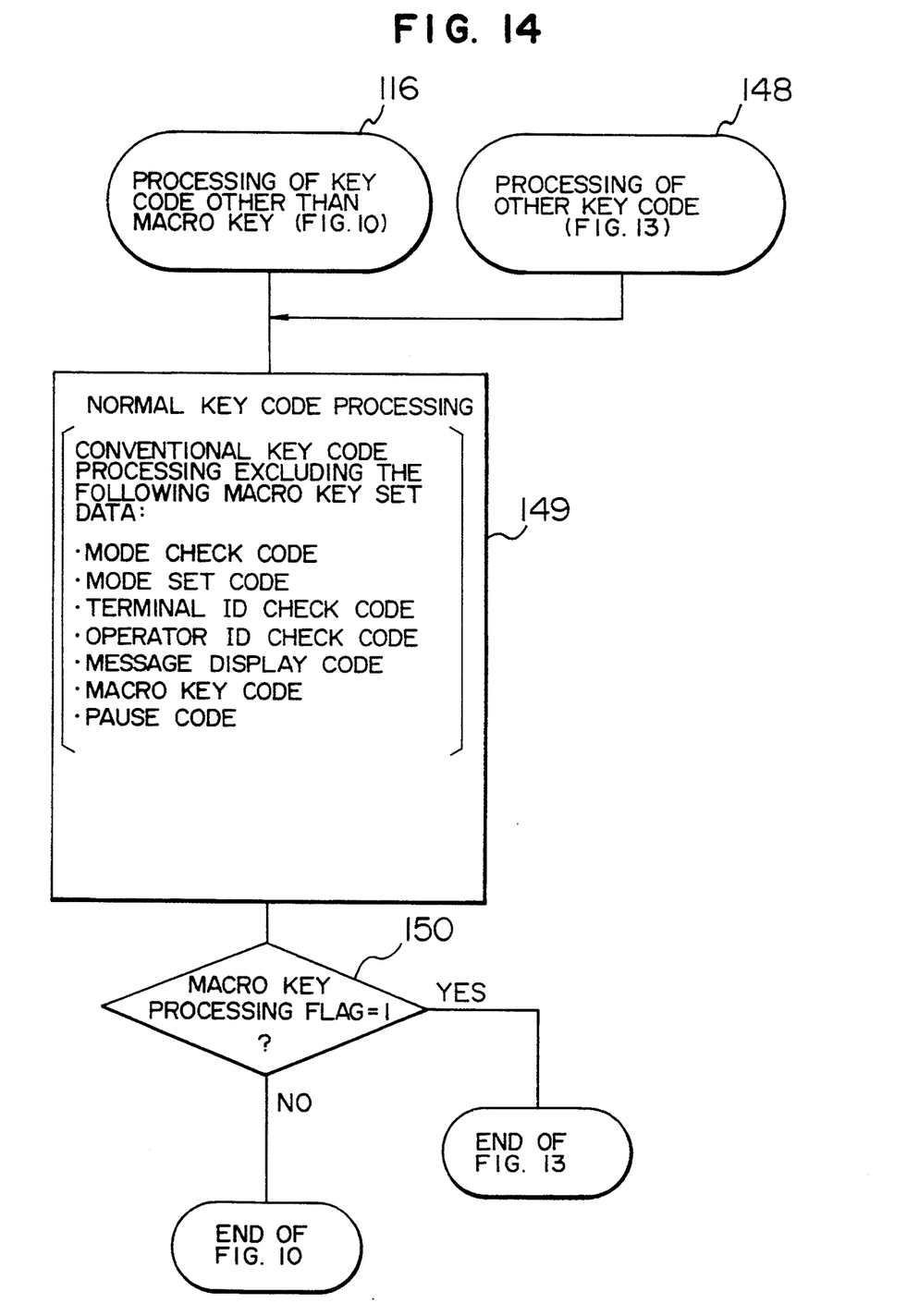
FIG. 14 is a flow chart for showing the flow of the macro key set data processing operation in the flow charts of FIGS. 10 and 13.

FIG. 14 shows an operation flow of the "key code processing other than the macro key" in the Step 116 in FIG. 13 and the "other key code processing" in the Step 148 in FIG. 13.

In Step 149, the macro key processing flag 65 for showing the state of being under the macro key processing is used to discriminate between the "key code processing other than the macro key" in the Step 116 in FIG. 10 and the "other key code processing" in Step 148 in FIG. 13. In this case, contents of both of the key code processings are the same. However, branch destination after ending these processings are different.

The "other key code processing" in the Step 148 in FIG. 13 is a processing within the macro key, or a part of the operation of the "macro key set data processing". After executing this processing, the process moves to the "macro key set data processing" again to execute the processing of the macro key set data of the next address. The process branches to "END" in FIG. 13.

On the other hand, the "code processing other than the macro key" in the Step 116 in FIG. 10 is different from the operation of the "macro key set data processing". After executing this processing, an input from the keyboard 1 is awaited. The process branches to "END" in FIG. 10. The macro key processing flag 65 in Step 150 in FIG. 14 is used to decide the branching in the Step 150 in FIG. 14.

Figure 15:
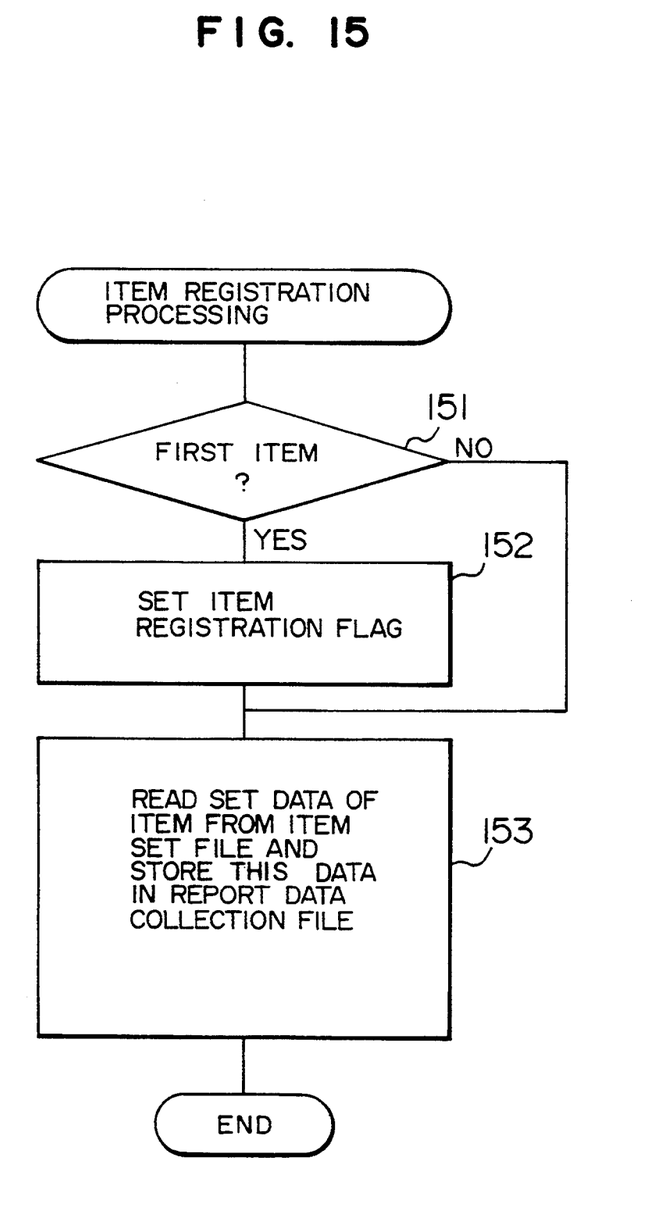
FIG. 15 is a flow chart for showing the flow of item registration operation in the flow-chart of FIG. 13.

FIG. 15 is a flow chart for explaining the item registration operation. When a first item is registered for each card in Step 151 in FIG. 15, the item registration flag 64 is set in Step 152: The item registration flag 64 is reset by the total processing. In Step 153, the item registration flag 64 is decided in the manner as described in the Steps 139 and 137 of the flow chart in FIG. 13, so that the work of the mode code set in the middle of the transaction is made invalid.

The above arrangement is made in order to avoid an occurrence of a problem that items having two different unit prices are registered in on the same card if it is possible to revise a unit price by changing the operation mode of the electronic register to the set mode in the middle of a transaction, for example.

The above embodiment explains an example of the case for operating the keyboard 1 of the electronic register as a method for setting macro key information and a display message within the memory 5 of the electronic register. It is also possible to combinedly set other registers or computers when a special keyboard for setting is used.

It has been explained in the above that when other macro key is to be set as macro key set data, it is checked whether this other macro key code is the same as the macro key and the setting of the same code is made invalid. It is also possible to eliminate this check processing by the register and to exclude the same macro key code when the macro key code is to be set in the macro key.

As is clear from the above embodiment, according to the present invention, the mode check code, the mode set code, the terminal ID check code, the operator ID check code, the message display code, the macro key code and the pause code can be added to the key code information on the keyboard, as functions that can be set to the macro key. With the above arrangement, a function is obtained that when the macro key has been operated the operation mode of the electronic register is checked automatically and the macro key is made valid only in a specific operation mode. A function is also obtained that when the macro key has been operated the operation mode of the electronic register is altered automatically and the key operation function valid only in the specific operation mode is performed by the macro key operated in other operation mode.

Further, a function is obtained that when the macro key has been operated, the terminal ID of the electronic register is checked automatically and the macro key is made valid only in the electronic register having a specific terminal ID. A function is also obtained that when the macro key has been operated the operator ID of the electronic register is checked automatically and the macro key is made valid only in the electronic register in which a specific operator ID has been set.

Further, a function is obtained that when the macro key has been operated a specific message can be automatically displayed corresponding to this macro key. A function is also obtained that when the macro key has been operated a macro key code other than the macro key is set to the macro key data which has been set corresponding to this macro key so that a plurality of macro key set data can be linked to one macro key. Further, a function is obtained that when the macro key has been operated a key input from the keyboard is processed in this macro key and a group of set key codes which have been set subsequently are processed.

I claim:

1. An electronic register comprising:

a memory for storing a key code for said register and seven kinds of codes including a mode check code for checking an operation mode of said register, a mode set code for altering said operation mode, a terminal ID check code for checking a terminal ID of said register, an operator ID check code for checking an ID of an operator who operates said register, a message display code for displaying a specific message, a macro key code and a pause code for waiting for a key input from a keyboard, which have been set as macro key set data corresponding to a macro key on a keyboard of said register; and an arithmetic operation control unit for, during read processing from the keyboard, sequentially transferring macro key set data which have been set subsequently to a key code decoder, said key code decoder processing the data respectively for said mode check code, said mode set code, said terminal ID check code, said operator ID check code, said macro key code and said pause code when said mode check code, said mode set code, said terminal ID check code, said operator ID check code, said macro key code respectively exist in the macro key set data corresponding to said macro key in the read processing from the keyboard, and for reading message data corresponding to said message display code from a message set file stored in said memory for said message display code and transferring said message data to a display unit.

2. An electronic register comprising:

means for setting a key code of said register and a mode check code for checking an operation mode of said register together with a set data number of a macro key, as macro key set data to be set within a memory of said register corresponding to said macro key, said macro key being disposed on a keyboard; and means for (i) checking whether the operation mode of said register coincides with the operation mode corresponding to said mode check code when said mode check code exists in said macro key set data which has been set corresponding to said macro key in read processing of the key code from the keyboard, (ii) when the operation mode of said register coincides with the operation mode corresponding to said mode check code, sequentially transferring said macro key set data to a key code decoder for processing macro key set data which has been set subsequently, and (iii) when the operation mode of said register does not coincide with the operation mode corresponding to said mode check code, skipping processing of the subsequently-set macro key set data and displaying an error, thus ending the read processing of said macro key.

3. An electronic register according to claim 2, further comprising:

means for setting a key code and a mode set code for altering the operation mode of said register as macro key set data to be set within a memory of said register corresponding to a macro key on said keyboard; and means for (i) saving in an operation mode stand-by buffer a current operation mode of said register when said mode set code exists in the macro key set data which has been set corresponding to said macro key in the read processing of the key code from the keyboard, (ii) altering the operation mode of said register to an operation mode corresponding to said mode set code, (iii) sequentially transferring the subsequently-set macro key set data to said key code decoder to process the data, and (iv) returning the operation mode of said register to the operation mode of said register in the state before the alteration which has been stored in the operation mode stand-by buffer at a point when all the processing of the macro key set data has been processed.

4. An electronic register according to claim 2, further comprising:

means for setting a terminal ID check code for checking a terminal ID of said register in addition to a key code as macro key set data to be set within a memory of said register corresponding to a macro key on said keyboard; and means for (i) checking whether said terminal ID coincides with a terminal ID corresponding to said terminal ID check code in the read processing of a key code from the keyboard, (ii) sequentially transferring the subsequently-set macro key set data to said key code decoder to process the data when said terminal ID coincides with said terminal ID corresponding to said terminal ID check code, and (iii) skipping the processing of the subsequently set macro key set data and displaying an error when said terminal ID does not coincide with said terminal ID corresponding to said terminal ID check code, thus ending the read processing of said macro key.

5. An electronic register according to claim 2, further comprising:

means for setting an operator ID check code for checking an ID of an operator who operates said register, in addition to a key code, as macro key set data to be set within a memory of said register corresponding to a macro key on said keyboard; and means for (i) checking whether an operator ID coincides with an operator ID corresponding to said operator ID check code when the operator ID check code for checking said operator ID exists in the macro key set data which has been set corresponding to said macro key in the read processing of a key code from said keyboard, (ii) sequentially transferring the subsequently-set macro key set data to said key code decoder to process the data when said operator ID coincides with said operator ID corresponding to said operator ID check code, and (iii) skipping the processing of the subsequently-set macro key set data and displaying an error when said operator ID does not coincide with said operator ID corresponding to said operator ID check code, thus ending the read processing of said macro key.

6. An electronic register according to claim 2, further comprising:

means for setting a message display code for displaying a specific message in addition to a key code as macro key set data to be set within a memory of said register corresponding to said macro key on said keyboard; and means operative when said message display code exists in the macro key set data which has been set corresponding to said macro key, in the read processing of a key code from said keyboard, for reading message data corresponding to said message display code from a message set file which has been set within said memory of said register in advance, and transferring said read data to a display unit, to display a specific message corresponding to said macro key.

7. An electronic register according to claim 2, further comprising:

means for setting a macro key code in addition to a key code as macro key set data to be set within a memory of said register corresponding to said macro key on said keyboard; and means operative when said macro key code exists in macro key set data which has been set corresponding to said macro key, in the read processing of a key code from said keyboard, for reading set data corresponding to said macro key from a macro key set file which has been set within said memory of said register, sequentially transferring said read data to said key code decoder to process the data, and processing a macro key code other than said macro key which has been set in the macro key.

8. An electronic register according to claim 2, further comprising:

means for setting a pause code for waiting for a key input from said keyboard in addition to a key code as macro key set data to be set within a memory of said register corresponding to a macro key on said keyboard; and means operative when said pause code exists in the macro key set data which has been set corresponding to said macro key, in the read processing of a key code from said keyboard, for processing a key input from said keyboard in a present timing stage, and sequentially transferring the subsequently-set macro key set data to said key code decoder to process the data.

* * * * *